United States Patent [19]

Glatt

[11] Patent Number: 4,772,193

[45] Date of Patent: Sep. 20, 1988

[54] ROTATION GRANULATOR

[76] Inventor: Werner Glatt, D-7851 Binzen, Loerrach (BRD), Fed. Rep. of Germany

[21] Appl. No.: 20,713

[22] Filed: Mar. 2, 1987

Related U.S. Application Data

[63] Continuation of Ser. No. 840,740, Mar. 18, 1986, abandoned, which is a continuation of Ser. No. 365,952, Apr. 6, 1982, Pat. No. 4,588,366.

[30] Foreign Application Priority Data

Apr. 13, 1981 [JP] Japan .................................. 56-55463

[51] Int. Cl.$^4$ ........................................... B29C 67/02
[52] U.S. Cl. ................................ 425/222; 23/313 FB; 34/10; 34/57 A; 34/57 D; 55/96; 55/304; 55/341 M; 264/117; 264/DIG. 51; 366/102; 422/143; 425/DIG. 20
[58] Field of Search ...................... 425/222, DIG. 20; 264/15, 117, DIG. 51; 55/274, 302, 341 R, 341 M, 341 MC, 96, 304; 241/5, 40, 275; 34/10, 57 A, 57 D, 58, 59, 102; 366/101, 102, 107, 195; 23/313 R, 313 FB; 422/143, 147

[56] References Cited

U.S. PATENT DOCUMENTS

| | | | |
|---|---|---|---|
| 1,974,952 | 9/1934 | Eiben | 55/341 M |
| 2,155,697 | 4/1939 | Young | 241/40 |
| 2,694,530 | 11/1954 | Anderson | 241/40 |
| 2,853,280 | 9/1958 | Cusi | 366/102 |
| 3,243,940 | 4/1966 | Larson | 55/341 M |
| 3,741,703 | 6/1973 | Reynolds | 425/222 |
| 3,748,103 | 7/1973 | Bean et al. | 264/117 |
| 3,879,855 | 4/1975 | Weiser et al. | 34/10 |
| 3,966,975 | 6/1976 | Hansen et al. | 425/222 |
| 4,305,590 | 12/1981 | Haikkala et al. | 241/28 |
| 4,323,312 | 4/1982 | Glatt et al. | 366/102 |
| 4,436,138 | 3/1984 | Kondo | 241/275 |
| 4,507,130 | 3/1985 | Roth | 55/341 MC |

FOREIGN PATENT DOCUMENTS

| | | | |
|---|---|---|---|
| 537210 | 4/1955 | Belgium | 264/15 |
| 149774 | 8/1920 | United Kingdom | 34/59 |

OTHER PUBLICATIONS

Perry, John H., *Chemical Engineers' Handbook*, 4th ed., McGraw-Hill, NY, NY, 1963.

*Primary Examiner*—Jay H. Woo
*Assistant Examiner*—James C. Housel
*Attorney, Agent, or Firm*—Fleit, Jacobson, Cohn & Price

[57] ABSTRACT

In a rotation granulator, the injection nozzles for the powder are provided along the jacket surface of the granulator container over the rotary table, so that the powder will arrive directly in the range of the stronger flow. In order to prevent any interruptions of the operation due to the filter part, a two-chamber system is proposed in which the first and second chambers may be alternately cut off. This makes it possible to operate the installation without any interruption. In order to control the air supply, the rotary table is mounted so that it may be moved up and down, in order that the width of the air gap between the rotary table and the inner wall of the conical casing may be adjusted. Lastly, a device for taking of samples provides a system of sluices or channels by which the low-pressure space of the granulator is actively prevented from being in direct contact with the free atmosphere.

28 Claims, 3 Drawing Sheets

ROTATION GRANULATOR

This is a continuation of application Ser. No. 840,740 filed Mar. 18, 1986, now abandoned, which is a continuation of application Ser. No. 365,952, filed Apr. 6, 1982, now U.S. Pat. No. 4,588,366, issued May 13, 1986.

BACKGROUND OF THE INVENTION

1. Field of the Invention

The invention is concerned with a rotation granulator for granualting, agglomerating, mixing and drying products of the pharmaceutical and chemical industry, of the food industry, and of agriculture.

2. Background of the Prior Art

Rotation granulators are particularly suitable for the manufacture of spherical items. Unmixed powdery substances are processed and given a spherical shape, due to the action of the rotation-air-injection producing homogeneous concentrated mases. The resulting substances may also be desiccated in the same installation.

In the apparatus known up to this time, the powder is injected from above into the central portion of the rotorgranulator. This is not altogether satisfactory because the injected powder moves slowly from the central portion of the rotary table, and a strong low-pressure area forms in that region. This entails the formation of lumps which have to be dissolved, thus delaying the processing operation.

In addition, the performance of the known apparatus is limited by the filtering system connected at the outlet side. Typically, the filters have to be cleaned, at certain time intervals, in order to remove the small particles that are pulled along by the indraft and deposited there. Since that is done by means of blowing those particles back onto the filters; it becomes necessary to shut-down the installation.

The known devices also have the added disadvantage that the air supply, which enters the granulation container from below, and which is sucked in along the circumference of the rotary table on the inside wall of the container, cannot be controlled at all, or cannot be controlled in a satisfactory manner.

An additional disadvantage of the known installations arises from the devices for the taking of samples; those devices are not well suited to leaave the flow conditions in the rotor-granulator part unaffected, inasmuch as, during the taking of samples, there will always be a connection with the ambient atmosphere. Such a connection has an unfavorable effect on the low-pressure area and, thereby, on the flow in the granulator part.

SUMMARY OF THE INVENTION

The present invention is directed to avoiding the disadvantages described above and of creating an installation in which the formation of spherical concentrated masses can be achieved, without any interruptions of the operation. In accordance with the invention, it is proposed that the injection nozzles for the powder be provided along the jacket surface of the granulator container over the rotary table, so that the powder will arrive directly in the range of the stronger flow. In that way, a considerably more rapid treatment is achieved and any risk of lump-formation is avoided.

In order to prevent any interruptions of the operation due to the filter part, a two-chamber system is proposed in which the first and second chambers may be alternately cut off. This makes it possible to operate the installation without any interruption. In order to control the air supply, it is propsed further that the rotary table be mounted so that it may be moved up and down, in order that the width of the air gap between the rotary table and the inner wall of the conical casing may be adjusted. Lastly, a device for taking of samples provides a system of sluices or channels by which the low-pressure space of the granulator is actively prevented from being in direct contact with the free atmosphere.

BRIEF DESCRIPTION OF THE DRAWINGS

In the following, the invention will be explained in detail on the basis of the drawings.

DETAILED DESCRIPTION OF THE PREFERRED EMBODIMENTS

Figure 1:
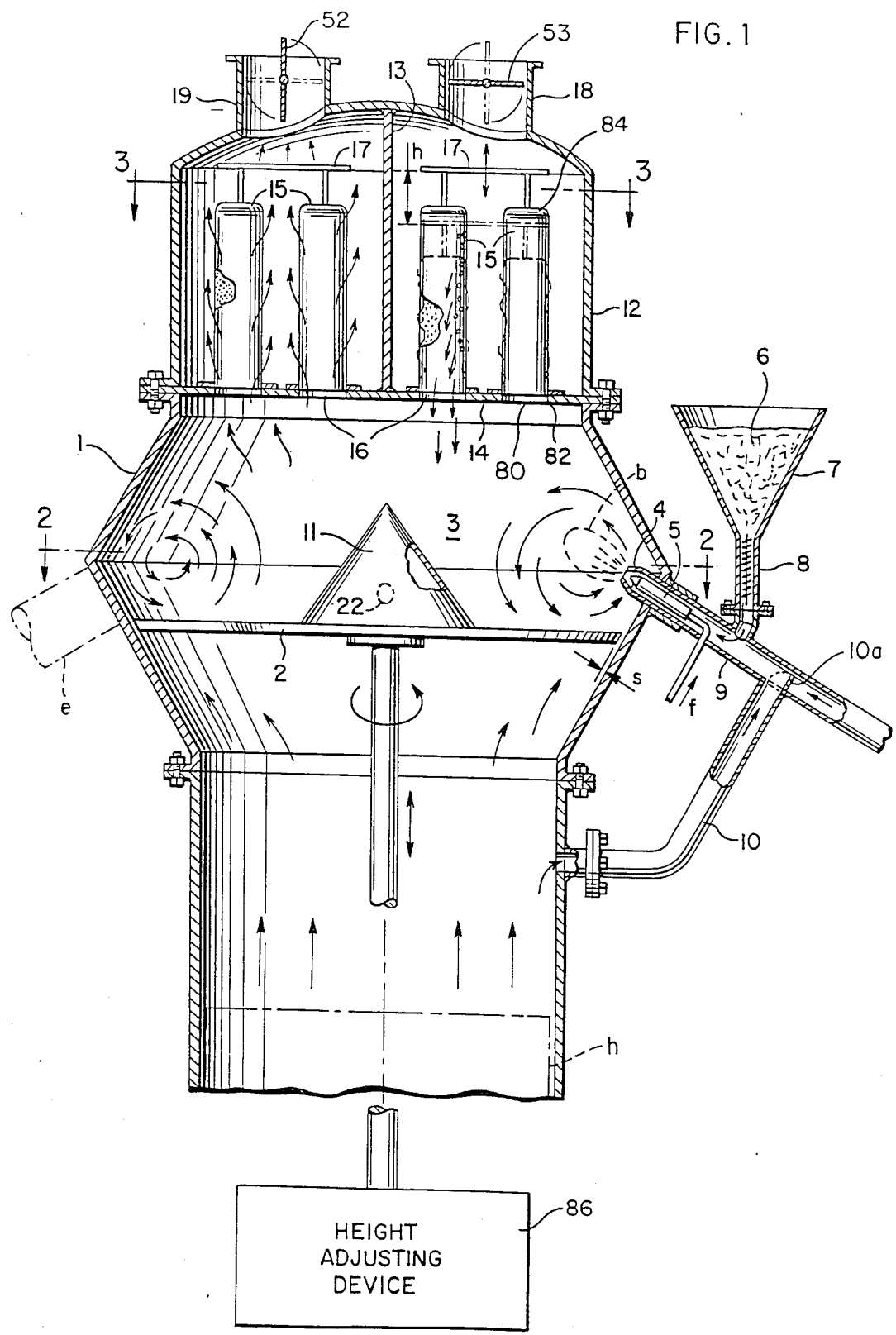
FIG. 1 is a vertical section through an installation to reveal the major elements of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In FIG. 1, 1 designates the granulator casing, in which the rotary table 2 has been mounted, in such a way that its height may be adjusted by conventional means 86, such as position servos. The lower part of the wall of the granulator casing has been developed in the form of a truncated cone, so that the width of the gap (s) may be varied by adjusting the height of the rotary table. It is possible to control the air supply by means of that step.

The air is sucked in from above and arrives, by way of the heating device (h), to the granulator space 3 in which a low-pressure area will be formed, since the air particles are pushed in the direction of the inner surface of the jacket of the container, due to the rotation of the rotating table by centrifugal force.

Figure 2:
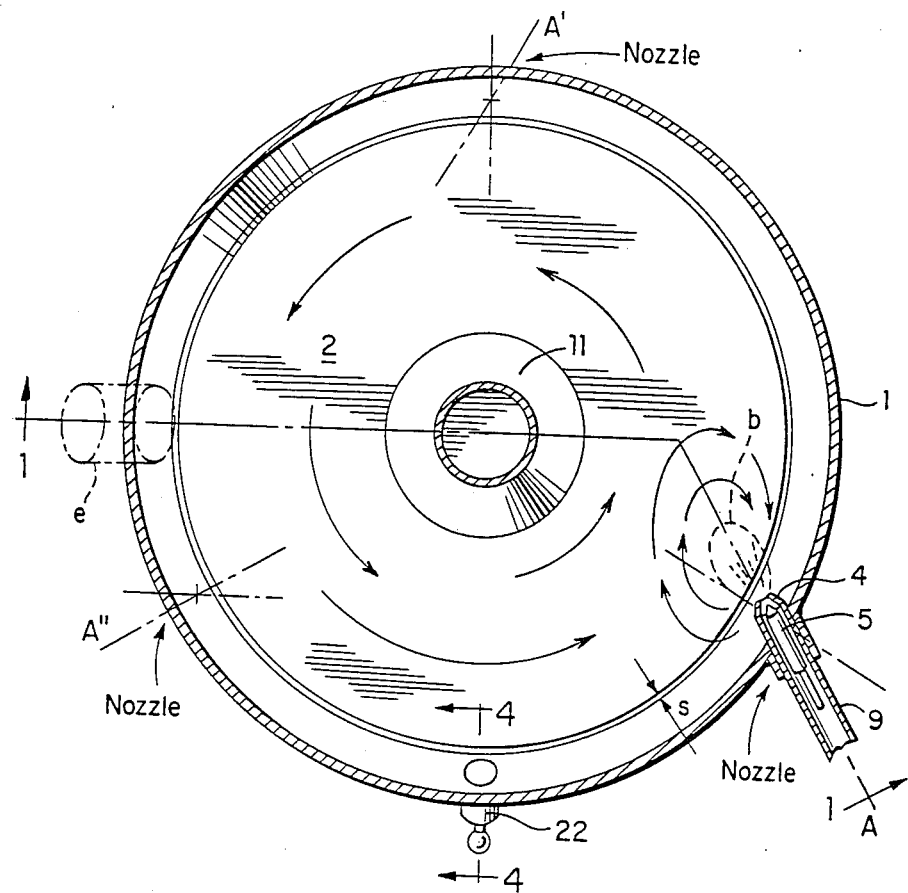
FIG. 2 shows a horizontal section along the line II—II in FIG. 1.

Injection nozzles 4 for the powder are mounted in the jacket surface of the container. It is possible to mount any desired number of nozzles. In FIGS. 1 and 2, it has been shown, by way of an example, how three nozzles offset by 120°, each in relation to one another, come to lie within the axes A, A' and A''. It should be noted that a schematic representation of a nozzle 4 is shown along axis A only. However, it is to be understood that a similar structure extends along axes A' and A''. Within the spraying nozzle 4 for the powder, an additional nozzle 5 has been provided for feeding a fluid (f) (air, liquid, or a mixture of both). The two nozzles may be shifted in their relation to one another, within their axis, so that it is possible to achieve the optimal adjustment of an air bubble (b) which will be formed, and around which the powder will be whirled as shown by the arrows. Additional nozzles 5 may also be found along axes A' and A''.

The powder 6 is conveyed from the storage container 7 by way of a dosing device 8 to the jet pipe 9 from which it will be blown into the granulator casing. For blowing, it is possible to use air either from the free atmosphere or from the part of the apparatus where the air was heated by means of the heating device (h). In the latter case, suction takes place by way of the bypass pipe 10. At the place wehre the bypass pipe 10 opens into the jet pipe, a flap 10a is provided to cut off the jet pipe 9 from either the free atmosphere or the bypass pipe 10. In those cases in which the material to be processed tends to form films, it is possible to add a separating means by way of the dosing device 8.

It is further evident from FIG. 1 that, on the rotary table 2, a concial replacement body 11 has been provided which also promotes the development of the flow conditions. Further, the replacement body prevents any accumulation of material within the region of the lowest velocity of rotation of the rotary table, from where it can be moved, otherwise, but slowly. A drain spout (e) is provided for draining the processed material.

On the granulation casing is mounted the filter part which consists of a filter casing 12, a partion 13, a base plate 14, and a plurality of filters 15.

Figure 3:
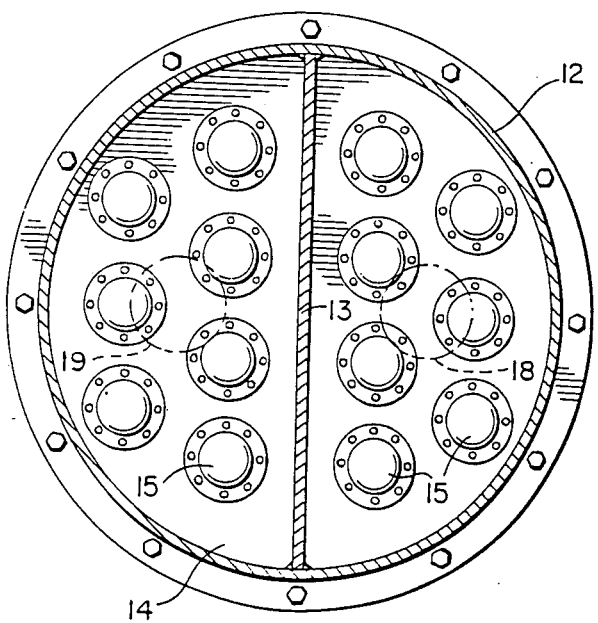
FIG. 3 shows a horizontal section along the line III-—III in FIG. 1.

The lower open ends 80 of the filters 15 have been fastened around bore holes 82 provided in the base plate 14. The closed upper ends 84 of the filters 15 are suspended over a system of rods 17. Vibrations are transmitted to that system of rods 17 for the purpose of cleaning the filters. The cleaning operation may be done mechanically or pneumatically. In the chamber shown on the right side of FIG. 1, it is shown in the drawing how the filters 15 may be vibrated by an amount sufficient to shake off any particles deposited on the filters and to drop the particles into the granulation container. During the process of cleaning the filters, the return pipe—which has not been shown—which joins up with the drain spout, is closed by means of the flap 22. The removal by suction takes place by way of the filter chamber shown on the left, by way of the connection pipe 19, the valve 21 of which is open. In that way, it is possible by means of a simple changeover of the valves 21 and continuously to carry on the operation, because at leaast one filter half is available at all times. The arrangement of the partition and of the filters may also be seen in FIG. 3.

Figure 4:
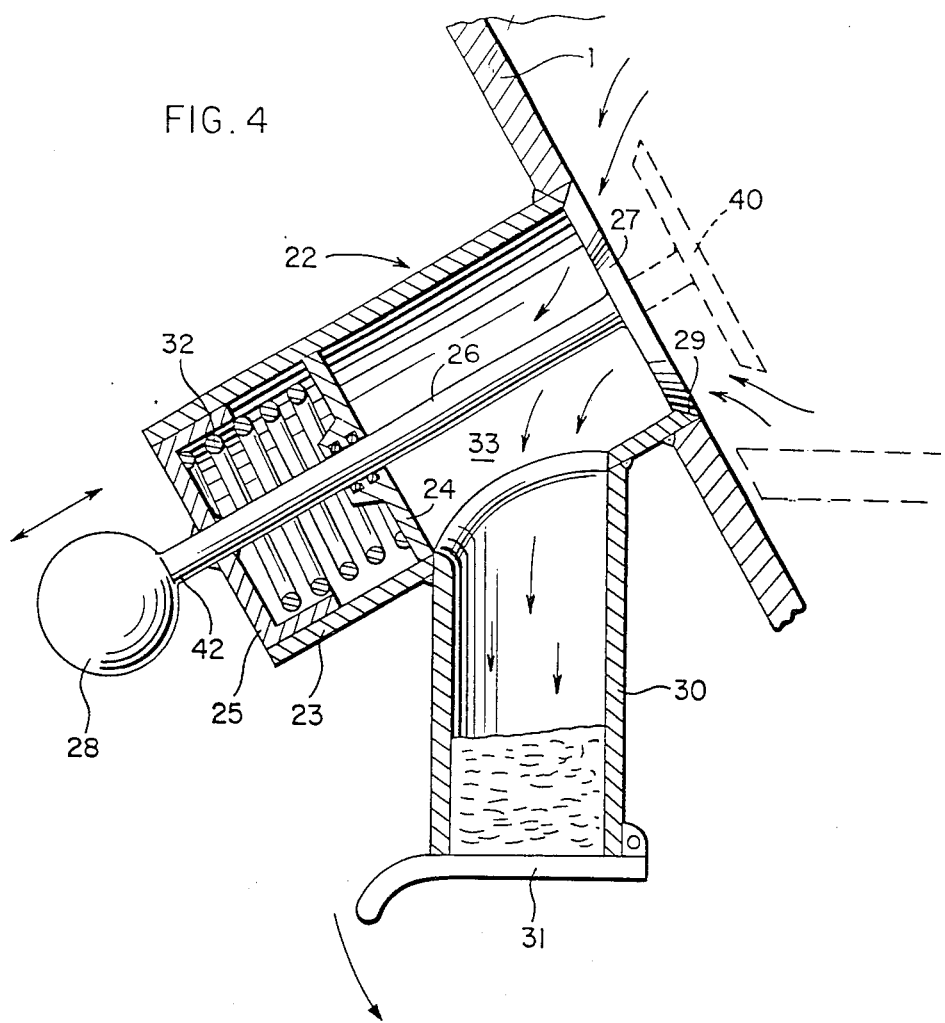
FIG. 4 shows a vertical section along the live IV—IV in FIG. 2.
Figure 5:
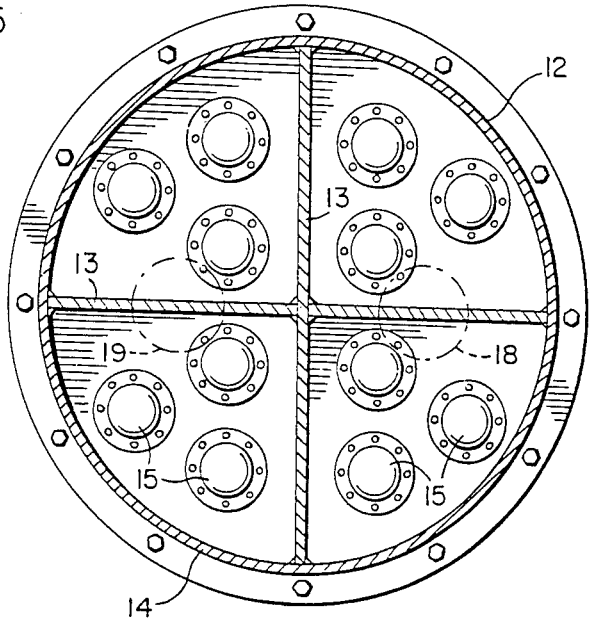
FIG. 5 shows another embodiment of the invention in which four separate filter chambers are provided, the view in FIG. 5 being similar to that of FIG. 4.

In the example of the embodiment of the invention, as shown in FIGS. 1 and 2, the device 22 for the taking of samples has been mounted on the front of the granulation container. FIG. 4 presents a sectional view of the device for the taking of samples on an enlarged scale. It consists of a cylindrical casing 23 which has a partition 24 spaced from either end of the casing. In one section of the cylinder 23, a plunger 25 has been placed which is rigidly connected with a valve rod 26.

On one end 40 of the valve rod 26, a valve disk 27 has been mounted, while a handle 28 has been fastened onto the other end 42. The plunger 25 is pushed out of the cylinder by means of a resilient member 32 as, for example, by means of a helical compression spring, so that the valve disk 27 comes to lie against the valve seat 29 and seals the granulator casing 1 against the free atmosphere. The cylidner 23 is connected with a receiving container 30, the lower end of which is closed by a cover 31. When the handle is actuated in the direction of the arrow shown, the spring 32 is compressed, on the one hand, and the valve disk 27 is lifted off a valve seat 29, on the other hand, as has been shown by a dotted line in the drawing. As has been shown by the arrows in the drawing, it is now possible for the material to reach the receiving container 30 by way of the space 33. When the handle 28 is released, the spring 32 returns the valve disk by way of the valve rod 26, so that the granulation container 3 will be closed once more. At this point in time only, the sample is removed by opening the cover 31. In view of the fact that the device for the removal of samples operates—as described above—according to the principle governing a sluice, any unfavorable effect on the flow conditions in the granulation container due to the taking of a sample is prevented since no direct connection with the free atmosphere is established.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. Apparatus for processing particles comprising:
   a processing casing defining a processing space within which said processing takes place, said casing having a lower opening and an upper opening communicating with said processing space;
   means for causing air to pass through said processing space in conjunction with a mass of particles and then to pass out said upper opening;
   a filter casing divided by partition means to define at least two filter chambers, each having a lower opening and an upper opening, said filter chambers being approximately the same size and arranged adjacent to one another;
   means for connecting the filter casing above the processing casing such that the lower opening of each filter chamber is unobstructedly connected to the upper opening of said processing casing to enable said air with particles entrained to pass from said processing space into each of said filter chambers;
   a plurality of filter means movably mounted within said filter chambers and sealingly connected with respect to the lower openings of said filter chambers and the upper opening of said casing such that all air passing through the upper opening of said casing passes into and through said filter means mounted within said chambers so that particles entrained in the air are caught and filtered by said filter means;
   vibrating means for vibrating each said filter means to shake off any particles caught and filterd by said filter means such that said particles are dropped off said filter means and fall by gravity through said lower opening of said associated filter chamber into said processing space while the processing is taking place; and
   valve means for alternately closing off said upper openings of said filter chambers while the lower openings of said filter chambers remain unobstructed and exposed to the processing taking place in the processing space
   to enable continuous operation of the apparatus while alternately cleaning said plurality of filter means.

2. Apparatus according to claim 1, further comprising a rotor rotatably mounted within said processing space.

3. Apparatus according to claim 1, further comprising means for introducing particles into said processing space; and
supply means for supplying particles to said injection means.

4. Apparatus according to claim 2, further comprising means for vertically adjusting said rotor.

5. Apparatus according to claim 2, wherein said processing casing has an internal surface defined about its periphery, and a plurality of injection means are positioned substantially equidistant from each other relative to the periphery of said surface.

6. Apparatus according to claim 5, wherein said injection means are constituted by three nozzles spaced approximately 120° from each other above the periphery of said surface, all of said nozzles lying in substantially the same plane.

7. Apparatus according to claim 6, wherein said plane is above said rotor.

8. Apparatus according to claim 3, wherein said injection means is oriented to direct particles in the direction of rotation of said rotor.

9. Apparatus according to claim 2, wherein said injection means is oriented to direct particles in a direction against the direction of rotation of said rotor.

10. Apparatus according to claim 5, wherein said surface opposite the periphery of said rotor is in the shape of a truncated cone.

11. Apparatus according to claim 2, wherein said air means is positioned above said upper opening of said processing casing for sucking air from said processing space to create a low-pressure area within said processing space.

12. Apparatus according to claim 2, wherein said injection means further comprises means for feeding fluid and solid particles into said processing space.

13. Apparatus according to claim 1, further comprising a generally horizontal table rotatably mounted within said processing space.

14. Apparatus according to claim 1, wherein said at least two filter chambers share a common discharge pipe.

15. Apparatus according to claim 1, wherein said vibrating means comprises a vibration generator, and means for connecting said filter means to said generator.

16. Apparatus according to claim 15, wherein said means for connecting comprises a system of rods.

17. Apparatus for processing particles comprising:
a processing casing defining a processing space within which said processing takes place, said casing having a lower opening and an upper opening communicating with said space;
air means positioned above said upper opening for causing air to pass through said processing space and out said upper opening;
a filter casing divided by a partition to define first and second filter chambers, each having a lower opening and and upper opening, said filter chambers being approximately the same size and arranged next to each other;
means for connecting the lower opening of each filter chamber to the upper opening of said processing casing and for connecting the upper opening of each of said filter casings to said air means to enable said air with entrained particles to pass unobstructedly from said processing space into each of said filter chambers;
a plurality of first filters movably mounted within said first chamber and sealingly connected with respect to the lower opening of said chamber such that all air passing into said chamber passes into said first filters;
a plurality of second filters movably mounted within said second chamber and sealingly connected with respect to the lower opening of said chamber such that all air passing into said chamber passes into said second filters;
first vibrating means for vibrating said first filters to shake off any particles deposited on said first filters and to drop the particles by gravity through said lower opening of said first filter chamber into said processing space while the processing is taking place;
second vibrating means for vibrating said second filters to shake off any particles deposited on said second filters and to drop the particles by gravity through said lower opening of said second filter chamber into said processing space while the processing is taking place;
valve means for alternately closing off said upper openings of said first and second filter chambers while the lower openings of said filter chambers remain unobstructed and exposed to the processing taking place in the processing space;
means for alternately closing said valve means; and
means for operating said vibration means in the filter chamber in which the upper opening is closed to enable continuous operation of the apparatus while alternately cleaning said first and second filters.

18. Apparatus according to claim 17, further comprising:
a rotor rotatably mounted within said processing space.

19. Apparatus according to claim 17, further including means for introducing fluid into said passing air including at least one injection nozzle mounted within said processing casing above said rotor; and supply means for supplying fluid to said injection nozzle.

20. Apparatus according to claim 18, further comprising means for adjusting said rotor in upward and downward directions to control the passage of air into said processing space.

21. Apparatus according to claim 18, wherein said nozzle is oriented to direct fluid in the direction of rotation of said rotor.

22. Apparatus according to claim 18, wherein said nozzle is oriented to direct fluid in a direction against the direction of rotation of said rotor.

23. Apparatus according to claim 17, wherein said air means comprises means for sucking air from said processing space to create a low-pressure area within said processing space.

24. Apparatus according to claim 17, further comprising at least one injection nozzle for feeding particles into said granulator space.

25. A method for processing materials in an apparatus that includes a processing casing defining a processing space, said casing having a lower opening and an upper opening communicating with said space, said method comprising the steps of:
passing air through said processing sapce and out said upper opening;
introducing particles into said processing space in conjunction with said passing air;

passing air and an entrained portion of said processed material from said processing space into each of a pair of first and second filter chambers, said filter chambers being approximately the same size and arranged next to each other, and having a lower opening and an upper opening with the lower opening exposed unobstructedly to the processing space;

movably mounted a plurality of first filters within said first chamber in sealing relation with the lower opening of the chamber;

movably mounting a plurality of second filters within said second chamber in sealing relation with the lower opening of the chamber;

vibrating said first and second filters alternately to shake off any particles deposited on said first and second filters and to drop the particles by gravity through said lower openings of said filter chambers into said processing space while the processing is taking place;

alternately closing off said upper openings of said filter chambers in correlation with vibrating of the filters to enble continuous operation of the apparatus while said filters are continuously exposed to the processing space.

26. The method of claim 25, further comprising the steps of controlling the air supply entering said processing space through the lower opening of said processing casing.

27. The method of claim 26, wherein said step of controlling the air supply includes, rotatably mounting a rotor within said processing space to establish a peripheral gap between the edge of the rotor and the outer boundary of said processing space and adjusting said rotor in upward and downward directions to control the size of said gap and thereby control the supply of air flowing through said processing space.

28. The method of claim 25, wherein said step of passing air comprises sucking air from said processing space to create a low-pressure area within said processing space.

* * * * *